2,910,442

SOLVENT FOR EXTRACTING ACTINIDE SALTS

Louis Kaplan, Park Forest, Ill., assignor to the United States of America as represented by the United States Atomic Energy Commission No Drawing. Application July 11, 1950
Serial No. 173,241

1 Claim. (Cl. 252—364)

This invention deals with the solvent extraction of actinide salts from aqueous solutions and in particular of salts in which the valence of the actinide element is at least +4.

It is an object of this invention to provide a process for solvent extraction of actinide values from aqueous solutions by which an improved distribution coefficient is obtained and by which the losses of the material to be extracted are reduced.

It is an object of this invention to provide a process for the solvent extraction of actinide values from aqueous solutions whereby the number of extraction stages necessary for complete separation is reduced as compared with those needed heretofore.

It is also an object of this invention to provide a process for the solvent extraction of actinide values from aqueous solutions whereby the quantity of solvent required is relatively low.

It is another object of this invention to provide a process for the solvent extraction of actinide values from aqueous solutions by which a simplified apparatus and in particular shorter extraction columns may be used.

Still another object of this invention is to provide a method of solvent extraction of actinide salts from aqueous solutions by which an improved recovery of the actinide values is possible for a given number of extraction stages.

It is still another object of this invention to provide a method of solvent extracting actinide salts from aqueous solutions in which the salting-out agent concentration and the acidity of the aqueous solution may be relatively low.

It is still another object of this invention to provide a process for the solvent extraction of plutonium and uranium values from aqueous solutions which yields satisfactory results even with the tetravalent salts. This feature makes it possible to use milder oxidizing conditions than when plutonium must be in the hexavalent state so that other elements, for instance, cerium and ruthenium, present in their unextractable lower oxidation states remain in this form, whereby the decontamination of plutonium with respect to cerium, ruthenium, etc. is considerably increased.

It is thus also an object of this invention to provide a process for the extraction of actinide values from aqueous solutions containing also fission product values by which an improved decontamination of the actinide values from the fission product values is obtained.

These and other objects are accomplished by providing for a complexing agent for the actinide salts in the solvent during the extraction, and more specifically carrying out the extraction in the presence of a substantially water-immiscible, preferentially solvent-soluble complexing agent.

The complexing agents for the process of this invention, apart from that they should show a preferred solubility in the extracting solvent, should also be stable to nitric acid, to nitrous acid and to oxidizing agents, substances frequently present in the aqueous solutions of actinide salts to be treated by the process of this invention. Organic amine salts, and in particular the salts, preferably the nitrates, of those amines having a high molecular weight, were found to give highly satisfactory results when used according to this invention. For instance, the following complexing agents are illustrative of the amine salts that have been successfully used in admixture with organic solvents: tetraalkylammonium nitrates, such as tetrabutylammonium nitrate, octadecyldimethylbenzylammonium chloride, salts of methyl isobutyl ketazine (hexone azine), alkylpyridinium nitrates, such as hexylpyridinium nitrate, salts of di-2-ethylhexyl-ethanolamine, the salts of higher alkyl pyridines, such as 2-(5-nonyl)pyridine salt, 4-(5-nonyl)pyridine salt, 2-hexylpyridine salt, the alkylammonium salts other than tetraalkylammonium salts, such as the salts of tri-n-butyl-amine, tri-n-amylamine, and di-2-ethylhexylamine, and the salts of diethylaniline, dicyclohexylamine, and tribenzylamine.

All these complexing agents were found to cause a considerable increase of the extraction of plutonium (IV), plutonium (VI), uranium (IV), uranium (VI), thorium, neptunium (IV), neptunium (VI) and protactinium valus, while the extraction of other metal values associated therewith, such as rare earth metal values and fission product values is only little affected by them.

The complexing agent may be provided in the solvent by adding it as such, i.e., as the amine salt, or by simply adding an amine. The amine then reacts with the acid present in the solvent and/or the aqueous solution thereby forming the amine salt required.

The process of this invention has a great many uses. It may be successfully applied, for instance, in the recovery and separation of uranium and thorium from monazite sand, pitchblende and carnotite-type ores. It has also been found useful for the separation of uranium from plutonium and for the separation of uranium and plutonium from fission product values. The process is useful, too, for the recovery of protactinium from pitchblende and the like.

The concentration of the complexing agent in the extracting solvent may vary widely; for example, concentrations ranging from 0.01 to 1 M are suitable. Concentrations from 0.02 to 0.2 M are preferred.

Extraction tests carried out with solvents containing the various complexing agents showed that the distribution equilibrium of the actinide values is reached in a very short period of time and that in most cases the maximum distribution ratios were rapidly obtained. Equilibrium for tracer concentrations of uranium was even reached in less than half a minute, while for macro concentrations of uranium the contact required with the aqueous solution for optimum results was found to be less than five minutes.

The effect of various organic amine salts, provided as amines or amine salts, on the distribution ratio (organic/aqueous) of plutonium is illustrated in Table I. In this set of experiments, hexone was used alone or with 0.1 M amine or amine salt as the extractant, and the aqueous solutions had a concentration of 1 M in aluminum nitrate, 0.5 M in nitric acid and a tracer concentration of plutonium (IV) nitrate.

Table I

| Amine or amine salt: | Pu distribution ratio (hexone/aqueous) |
|---|---|
| None | 2.1 |
| Tetrabutylammonium nitrate | 230 |
| Tri-n-butylamine | 92 |
| Tri-n-amylamine | 200 |
| Di-2-ethylhexylethanolamine | 115 |
| 2-hexylpyridine | 145 |
| 2-(5-nonyl)pyridine | 150 |
| 4-(5-nonyl)pyridine | 158 |
| Diethylaniline | 12 |
| Di-2-ethylhexylamine | 15 |
| Hexone ketazine | 50 |

It is obvious from this table that while the extraction with hexone to which no complexing agent has been added yields a distribution rate of 2.1 only, the addition of a complexing agent according to the invention in a concentration of 0.1 M increases the distribution factor up to 230. These high distribution ratios were found to be reproducible and to remain constant for long periods of time.

Another set of experiments was carried out in order to ascertain the effect of the aluminum nitrate concentration on the extraction of tetravalent plutonium into hexone with and without 2-hexylpyridine. It was found that an increase of the aluminum nitrate concentration also increased the extractability of ruthenium in both cases. The effect of the increase of aluminum nitrate concentration was found to be of similar magnitude with and without 2-hexylpyridine. In these experiments, an aqueous solution, 0.5 M in nitric acid and 0.2 M in aluminum nitrate, yielded a distribution ratio for plutonium (IV) of about 0.03 with hexone alone and of about 4 with hexone containing 0.1 M 2-hexylpyridine. Under the same conditions, except that the aluminum nitrate concentration was 1 M, a distribution ratio of about 2 for hexone alone and of about 130 with 0.1 M 2-hexylpyridine in the hexone were obtained. An aluminum nitrate concentration of 2 M yielded a distribution ratio for the plutonium of about 50 without the complexing agent and of about 430 with 0.1 M 2-hexylpyridine in the hexone. These data show that an improved extraction is obtained with the increase of salting-out agent concentration, and they also give evidence of the highly beneficial effect of the complexing agent.

Table II illustrates the considerable improvement obtained when the invention is utilized for the extraction of uranyl nitrate. The aqueous uranyl nitrate solution used in these tests was 8 M in ammonium nitrate and 0.4 M in nitric acid. Hexone was used alone or with 0.1 M amine or amine salt.

Table II

| Amine or amine salt: | U distribution ratio (hexone/aqueous) |
|---|---|
| None | 3 |
| Tributylamine | 42 |
| 2-hexylpyridine | 24 |
| Tetrabutylammonium nitrate | 98 |
| Octadecyldimethylbenzylammoniumchloride | 52 |

The effect of the concentration of the complexing agent was also studied, and it was found that with an increase of the concentration the extraction is improved. Table III shows this function between distribution coefficient obtained and concentration used for a number of complexing agents; the concentrations in the hexone ranged from 0 to 0.2 M. The initial aqueous solution was 8 M in ammonium nitrate, 0.4 M in nitric acid, and 0.02 M in uranyl nitrate.

Table III

| Amine or Amine Salt Used | Uranium Distribution Ratio (hexone/aqueous) | | | | |
|---|---|---|---|---|---|
| | 0 M amine | 0.02 M amine | 0.05 M amine | 0.10 M amine | 0.20 M amine |
| None | 2.65 | | | | |
| Tri-n-butylamine | | 6.23 | 12.5 | 32.4 | 67.8 |
| 2-hexylpyridine | | 5.4 | 13.4 | 26.7 | 56.9 |
| Do [1] | | 4.9 | 10.7 | 20.3 | 51.5 |
| Hexone azine | | 8.4 | 12.0 | 23.5 | 49.2 |
| Di-2-ethylhexylamine | | 6.0 | 8.6 | 16.5 | 33.0 |
| Tribenzylamine | | 7.1 | 8.8 | 9.3 | 12.5 |
| Tetrabutylammonium nitrate | | | | 9.35 | |
| Octadecyldimethylbenzylammonium chloride | | | | 52.4 | |

[1] Aqueous solution contained 0.1 M $K_2Cr_2O_7$ to test effect of oxidizing agent on the enhancement of the distribution ratio by the amine.

Table IV illustrates the application of the process of this invention to the extraction of thorium. The aqueous solutions were 0.5 M in $Th(NO_3)_4$, 6 M and 8 M in ammonium nitrate, respectively, and 2 M and 0.2 M in nitric acid, respectively. Hexone was used alone or with 0.1 M amine. Also, in these cases, the addition of a complexing agent increased the extractability of thorium considerably.

Table IV

| Aqueous Solution | Amine | Th Distribution Ratio (hexone/aqueous) |
|---|---|---|
| 8 M $NH_4NO_3$; 0.2 M $HNO_3$ | None | 0.05 |
| 8 M $NH_4NO_3$; 0.2 M $HNO_3$ | Methyl isobutyl ketazine | 27 |
| 6 M $NH_4NO_3$; 2 M $HNO_3$ | None | 0.08 |
| 6 M $NH_4NO_3$; 2 M $HNO_3$ | Di-2-ethylhexylethanolamine | 6 |

For an efficient extraction of thorium from the aqueous solutions, a relatively high acidity and a high concentration of the salting-out agent were found to be necessary. The fact that the acidity and concentration of the salting-out agent do not essentially affect the extraction of uranium from aqueous solutions, creates a possibility of separating uranium from thorium values contained together in aqueous solutions. For this purpose of separating uranium and thorium, the aqueous solution is given a low acidity and a low concentration of salting-out agent; it is then contacted with the solvent-complexing agent mixture. The low acidity and low salting-out agent concentration cause a relatively low extraction of thorium by itself; in addition, the high concentration of uranium salt in the solvent acts as a back salting-out agent for the thorium so that the beneficial effect of the complexing agent on the thorium extraction is compensated for and greatly reduced. Thus, the solvent phase formed will contain most of the uranium, while the aqueous phase retains the bulk of the thorium. By repetition of the extraction cycle using the uranium salt extracted from the organic solvent by water, a practically complete separation of the uranium from the thorium may be accomplished.

Table V demonstates the improved extraction obtained with aqueous solutions containing neptunium (IV). The solutions contained 8 M ammonium nitrate, 0.2 M nitric acid, 0.05 M ferrous ammonium sulfate and a tracer concentration of neptunium (IV) nitrate. The hexone was used alone or with 0.1 M amine. Improved extraction was obtained when a complexing agent was added to the hexone.

Table V

| Amine: | Np distribution ratio (hexone/aqueous) |
|---|---|
| None | 0.01 |
| Tributylamine | 3 |
| Di-2-ethylhexylethanolamine | 1 |

Since the actinide elements are only extracted to a substantial degree if in their tetravalent or higher oxidation state, while the trivalent actinide elements as well as most fission product elements are extracted to a negligible degree only even when a complexing agent is added to the solvent, the process of this invention may be used for the separation of the various actinide elements from each other and from fission product elements. In these cases, the elements to be extracted are oxidized to a valence state of at least +4, while the elements to be retained by the aqueous phase are retained in, or converted to, their trivalent state.

Ruthenium, the valence of which varies from 2 to 8, is considerably less organic-solvent-soluble in its reduced forms than it is, for instance, in its octavalent state. Since, by the process of this invention, extraction may be carried out with the tetravalent actinide elements, relatively mild oxidizing conditions only need to be employed in order to convert the trivalent salts to the tetravalent ones; consequently, oxidation of ruthenium to the higher valence and particularly to the octavalent state is avoided. This accounts for a low extraction of ruthenium, while that of the actinide elements is extremely high, and thus for an excellent separation of the actinide elements from ruthenium.

Table VI shows the application of the process of this invention to the separation of plutonium from fission product values. There the distribution ratios of zirconium, ruthenium and cerium values as representatives of fission products and that of plutonium have been determined when extracted with hexone 0.5 M in nitric acid alone and with hexone of the same acidity but additionally containing 0.1 M 2-hexylpyridine, which was converted by the nitric acid to 2-hexylpyridinium nitrate.

The aqueous solutions used for these experiments of Table VI contained 1.0 M $Al(NO_3)_3$, 0.5 M $HNO_3$, 0.05 M $Fe(NH_4)_2(SO_4)_2$, 0.08 M hydrazine and plutonium and either ruthenium, zirconium or cerium in tracer concentration. The solution in each experiment was made 0.1 M in $KMnO_4$ at room temperature and allowed to stand for one hour, then made 0.25 M in hydrogen peroxide, also at room temperature, and allowed to stand for two hours before equilibration with the hexone.

Table VI

| Fission Product | 2-hexylpyridine | Distribution Ratio (hexone/aqueous) | |
|---|---|---|---|
| | | Fission Product | Plutonium |
| Zirconium | Present | 0.007 | 70 |
| Do | None | 0.001 | 2 |
| Ruthenium | Present | 0.54 | 80 |
| Do | None | 0.26 | 2 |
| Cerium | Present | 0.001 | 135 |
| Do | None | 0.0001 | 3 |

The general procedure used in the tests of Table VI was to equilibrate 5 cc. of each of the aqueous solutions to be treated and the solvent. After equilibration, aliquots were removed to determine the distribution ratio.

The results of these experiments of Table VI indicate that the effect of the 2-hexylpyridinium nitrate on the extractability of the important fission products is less pronounced than on the extractability of plutonium so that an increased decontamination is possible by this process.

Solvents usable for extraction in the processes of this invention are ethers, glycol ethers, esters, ketones, alcohols, alkyl phosphates, nitrohydrocarbons and alkyl sulfides. A common structural property of all of these types of compounds is that they have an atom capable of donating an electron pair to a coordination bond. The extraction solvent is a liquid substantially immiscible with water and aqueous solutions. If it is a solid at room temperature, the extraction is carried out at a temperature above its melting point. The following is a list of compounds that are suitable extractants for the separation of actinide salts from aqueous solutions containing salting-out agents:

Ethyl ether
Isopropyl ether
Butoxyethoxyethane (ethyl butyl "Cellosolve")
Diethyl ether of ethylene glycol (diethyl "Cellosolve")
Dibutyl ether of diethylene glycol (dibutyl "Carbitol")
Dibutyl ether of tetraethylene glycol
Ethyl acetate
n-Propyl acetate
Butoxyethoxyethyl acetate (butyl "Carbitol" acetate)
Methyl isobutyl ketone (hexone)
Acetophenone
Mesityl oxide
Cyclohexanone
Tert-amyl alcohol
2-ethyl-1-hexanol
Tributyl phosphate
Trioctyl phosphate
Dioctyl hydrogen phosphate
Octadecyl dihydrogen phosphate
Nitromethane
Ethyl sulfide
n-Propyl sulfide As salting-out agents, water-soluble inorganic salts are suitable; however, the following metal nitrates are preferred: $NaNO_3$, $Ca(NO_3)_2$, $KNO_3$, $Sr(NO_3)_2$, $LiNO_3$, $Mg(NO_3)_2$, $NH_4NO_3$, $La(NO_3)_3$, $Mn(NO_3)_2$, and $Al(NO_3)_3$.

The ratio of organic solvent to aqueous solution can be varied greatly, e.g., between 10 to 1 and 1 to 10.

It will be understood that this invention is not to be limited to the details given herein but that it may be modified within the scope of the appended claim.

What is claimed:

A solvent mixture comprising hexone and from 0.1 to 1 M 2-hexylpyridine.

References Cited in the file of this patent

UNITED STATES PATENTS

| 2,188,645 | Buffington | Jan. 30, 1940 |
| 2,407,149 | Gardenier | Sept. 3, 1946 |

OTHER REFERENCES

Harvey et al.: "Journal of the Chemical Society," August 1947, pages 1010–1021 at 1020 and 1021.

Templeton et al.: "Journal of Physical and Colloid Chemistry," vol. 51, pages 1441–1449 (1947).

Watt et al.: "Journal of the American Chemical Society," vol. 72, page 2801 (June 1950).